United States Patent [19]

Imai

[11] Patent Number: 5,331,812
[45] Date of Patent: Jul. 26, 1994

[54] TRAVELING SPEED CHANGEOVER DEVICE FOR HYDRAULIC EXCAVATOR

[75] Inventor: Hiroshi Imai, Kyoto, Japan

[73] Assignee: Kabushiki Kaisha Komatsu Seisakusho, Tokyo, Japan

[21] Appl. No.: 910,261
[22] PCT Filed: Jan. 17, 1991
[86] PCT No.: PCT/JP91/00043
  § 371 Date: Jul. 16, 1992
  § 102(e) Date: Jul. 16, 1992
[87] PCT Pub. No.: WO91/10784
  PCT Pub. Date: Jul. 25, 1991

[30] Foreign Application Priority Data

Jan. 18, 1990 [JP] Japan .................. 2-9762

[51] Int. Cl.⁵ .............................. F16D 31/02
[52] U.S. Cl. ............................ 60/450; 60/452
[58] Field of Search ......... 60/443, 450, 452, 465, 60/493

[56] References Cited

U.S. PATENT DOCUMENTS 3,203,165  8/1965  Parr ......................... 60/465
5,085,051  2/1992  Hirata ...................... 60/450

FOREIGN PATENT DOCUMENTS 49-100090  8/1974  Japan .
59-106333  6/1984  Japan .

Primary Examiner—Edward K. Look
Assistant Examiner—F. Daniel Lopez
Attorney, Agent, or Firm—Richards, Medlock & Andrews

[57] ABSTRACT

A traveling speed changeover device for a hydraulic excavator which can optimize the traveling speed in accordance with the road conditions and which enables a working machine of the excavator to be operated during traveling without impairing the simultaneous operation characteristic. To this end, the traveling speed changeover device has a spring set force adjusting device which includes: a traveling speed changeover switch (5); a controller (7) for computing a signal set by the traveling speed changeover switch; a solenoid actuated control pressure changeover valve (6) which operates in accordance with a command given by the controller; and a spring force adjusting cylinder (9) for adjusting the set force of a differential pressure setting spring (11a) of a load sensing valve (11) in accordance with the operation of the solenoid actuated control pressure changeover valve. The traveling speed changeover device further has a motor capacity changeover device for changing the capacity of the traveling motors, including traveling motor capacity changeover valves (13a, 13b) and traveling motor capacity control cylinders (15a, 15b) for changing the capacities of the traveling motors (4a, 4b) over two stages.

12 Claims, 3 Drawing Sheets

TRAVELING SPEED CHANGEOVER DEVICE FOR HYDRAULIC EXCAVATOR

TECHNICAL FIELD

The present invention relates to a traveling speed changeover device for a hydraulic excavator and, more particularly, to a traveling speed changeover device for a hydraulic excavator capable of changing the traveling speed over three or more stages to provide an optimum traveling speed according to the condition of the work while improving the simultaneous operation characteristic during fine control of the working machine.

BACKGROUND ART

Conventionally, the traveling speed of a hydraulic excavator is controlled by supplying hydraulic pressure from a hydraulic pump 51 to left and right traveling motors motor 54a, 54b via a swivel joint 53, after controlling the hydraulic pressure by left and right travel operation valves 52a, 52b, as shown in FIG. 3. When a traveling speed changeover switch 55 is set to a first stage travelling speed, the solenoid of a control pressure changeover valve 56 is de-energized so that the control pressure changeover valve 56 is set to a position a. Therefore, pilot cylinders 59a, 59b of the traveling speed changeover valves 58a, 58b for the left and right traveling motors 54a, 54b are connected to a tank 66 via the swivel joint 53 and the control pressure changeover valve 56, so that the traveling speed changeover valves 58a, 58b also are set to their position a. Consequently, traveling motor capacity control cylinders 60a, 60b are connected to the tank 66, so that the capacities of the left and right traveling motors 54a, 54b are increased to a value corresponding to the first stage of the traveling speed.

Subsequently, a traveling operation lever (not shown) is operated to set the traveling operation valves 52a, 52b to their position a, so that the hydraulic oil discharged from the hydraulic pump 51 is supplied to the left and right traveling motors 54a, 54b through associated driving lines 61a, 61b, and is discharged from the left and right traveling motors 54a, 54b into discharge lines 62a, 62b. In this state, counterbalance valves 63a, 63b have been set to their position a by the operating hydraulic pressure existing in the driving lines 61a, 61b, so that the oil discharged to the discharge lines 62a, 62b is returned to the tank 66 via a return line (not shown, past the counterbalance valves 63a, 63b, swivel joint 53 and the running operation valves 52a, 52b. Therefore, the left and right traveling motors 54a, 54b, which have been set to first stage traveling speed, are operated at a speed corresponding to the amount of operation of the above-mentioned traveling operation lever, whereby the excavator travels forward or backward at the corresponding speed. The positions a of the travel operation valves 52a, 52b are assumed to correspond to the forward traveling of the excavator. Thus, the positions b of the same correspond to backward traveling. The operation for the backward traveling is not described because it is substantially the same as that for the forward traveling. Numeral 64 designates a load sensing valve which has a first pilot chamber 64b for receiving oil discharged from the hydraulic pump 51 and a second pilot chamber 64c for receiving the higher one of the load pressures existing in the driving lines 61a, 61b of the traveling motors 54a, 54b, via the traveling operation valves 52a, 52b and check valves 65a, 65b. The discharge pressure of the hydraulic pump 51 is so reduced as to maintain a balance of force and counter force produced by the pressures in the first and second pilot chambers 64b and 64c and the force produced by a spring 64a, thereby controlling the capacity control cylinder 51a of the hydraulic pump 51. That is, a pressure differential corresponding to the force of the spring 64a always exists across each travel operation valve 52a, 52b, so that the rate of discharge of oil from the hydraulic pump 51 is increased and decreased in accordance with the amounts of operation of the travel operation valves 52a, 52b.

For attaining the second speed stage, the traveling speed changeover switch 55 is set to the second stage traveling speed so that the solenoid 56a of the control pressure changeover valve 56 is energized to set the control pressure changeover valve 56 to the position b. As a result, the traveling speed changeover valves 58a, 58b of the left and right traveling motors 54a, 54b are set to their position b. Consequently, driving hydraulic pressures in the left and right traveling motors 54a, 54b are introduced into the traveling motor capacity control cylinders 60a, 60b, whereby the capacity of the left and right traveling motors 54a, 54b is decreased to establish the second speed stage. The effect produced by the operation of the traveling operation valves 52a, 52b is not described because it is materially the same as that in the traveling at the first speed stage.

In this conventional system, the speed of the traveling motors 54a, 54b are controllable only in two stages. This causes an excessively abrupt change in the traveling speed when the speed stage is switched from one to the other to attain the traveling condition which is optimum for the instant state of work and the road condition. In addition, if one of the high- and low-speed stages is set to an optimum level, the speed obtained with the other speed stage is often too high or too low, which makes it difficult for the operator to select the optimum speed stage according to the state of work and road conditions. In general, the conventional traveling system is so designed that the discharge rate from the hydraulic pump 51 is maximized when the excavator is traveling. Therefore, if the working machine is operated during traveling, the excavator may be suddenly decelerated to oscillate even when the amount of operation of the working machine is very small. Thus, the conventional arrangement is not suitable for simultaneous operation of the traveling system and the working system.

In view of the above-described shortcomings of the known art, the present invention aims at providing a traveling speed changeover device for a hydraulic excavator, wherein a set force adjusting means is provided to enable adjustment of the set differential pressure so as to make it possible to change the speed of the traveling motors over a plurality of stages, thus optimizing the traveling speed for instant road conditions, while eliminating deterioration of simultaneous operability which hitherto has occurred when the working machine is operated during traveling.

SUMMARY OF THE INVENTION

According to the present invention, there is provided a traveling speed changeover device for a hydraulic excavator of the type in which oil discharged from a hydraulic pump is supplied to left and right traveling motors via left and right travel operation valves, and the pressure of oil discharged from the hydraulic pump is introduced into a first pilot valve of a load sensing valve which controls the capacity control cylinder of the hydraulic pump, while a second pilot chamber of the load sensing valve receives driving pressure existing in the traveling motors, so that the capacity control cylinder of the hydraulic pump is controlled in accordance with the balance of the thrust forces produced in the first and second pilot chambers and the force of a differential pressure setting spring, the traveling speed changeover device comprising: a spring set force adjusting device capable of changing the set force of the differential pressure setting spring over a plurality of stages. The spring set force adjusting device includes: a traveling speed changeover switch; a controller for computing a signal set by the traveling speed changeover switch; a solenoid actuated control pressure changeover valve which operates in accordance with a command given by the controller; and a spring force adjusting cylinder for adjusting the set force of the differential pressure setting spring of the load sensing valve in accordance with the operation of the solenoid actuated control pressure changeover valve.

The traveling speed changeover device of the present invention can have a motor capacity changeover device for changing the capacity of the traveling motors, the motor capacity changeover device including: a traveling speed changeover switch; a controller for computing the signal set by the traveling speed changeover switch; a solenoid actuated control pressure changeover valve which operates in accordance with a command given by the controller; and traveling motor capacity changeover valves and traveling motor capacity control cylinders for changing the capacities of the traveling motors over two stages in accordance with the operation of the solenoid actuated control pressure changeover valve.

It is possible to arrange such that the spring set force adjusting device or the capacity changeover device of the traveling motors is selectively connected to a source of the control hydraulic pressure or to a tank by the operation of the solenoid actuated control pressure changeover valve.

In general, the flow rate Q of oil passing through an operation valve is given as follows in accordance with the pressure differential $P_P-P_L$ between the pressure $P_P$ upstream of the operation valve and the pressure $P_L$ downstream of the operation valve and the opening degree A of the operation valve:

$$Q \propto A \cdot \sqrt{(P_p - P)} \quad (1)$$

In the present invention, the pressure $P_P$ at the upstream side of the travel operation valve is the discharge pressure of the hydraulic pump, while the pressure $P_L$ at the downstream side of the travel operation valve is the driving pressure acting on the traveling motors. The pressure differential $P_P-P_L$ is determined by the spring force F of the differential pressure setting spring of the load sensing valve, so that the following relationship is established:

$$Q \propto A \cdot \sqrt{(F)} \quad (2)$$

Therefore, by changing the spring force F over a plurality of stages, it is possible to obtain a plurality of stages of the displacement Q of the hydraulic pump, i.e., a plurality of stages of the traveling speed, for a given amount of operation (opening) A of the travel operation valve. By providing a traveling motor capacity changeover device which can change the capacity of the traveling motors in two stages, it is possible to obtain speed stages of a number which is double the abovementioned plurality of speed stages. The traveling speed can be changed over a plurality of stages by selectively connecting the spring set force adjusting device or the traveling motor capacity changeover device to a tank, through the operation of the solenoid actuated control pressure changeover valve.

THE BEST MODE FOR CARRYING OUT THE INVENTION

Figure 1:
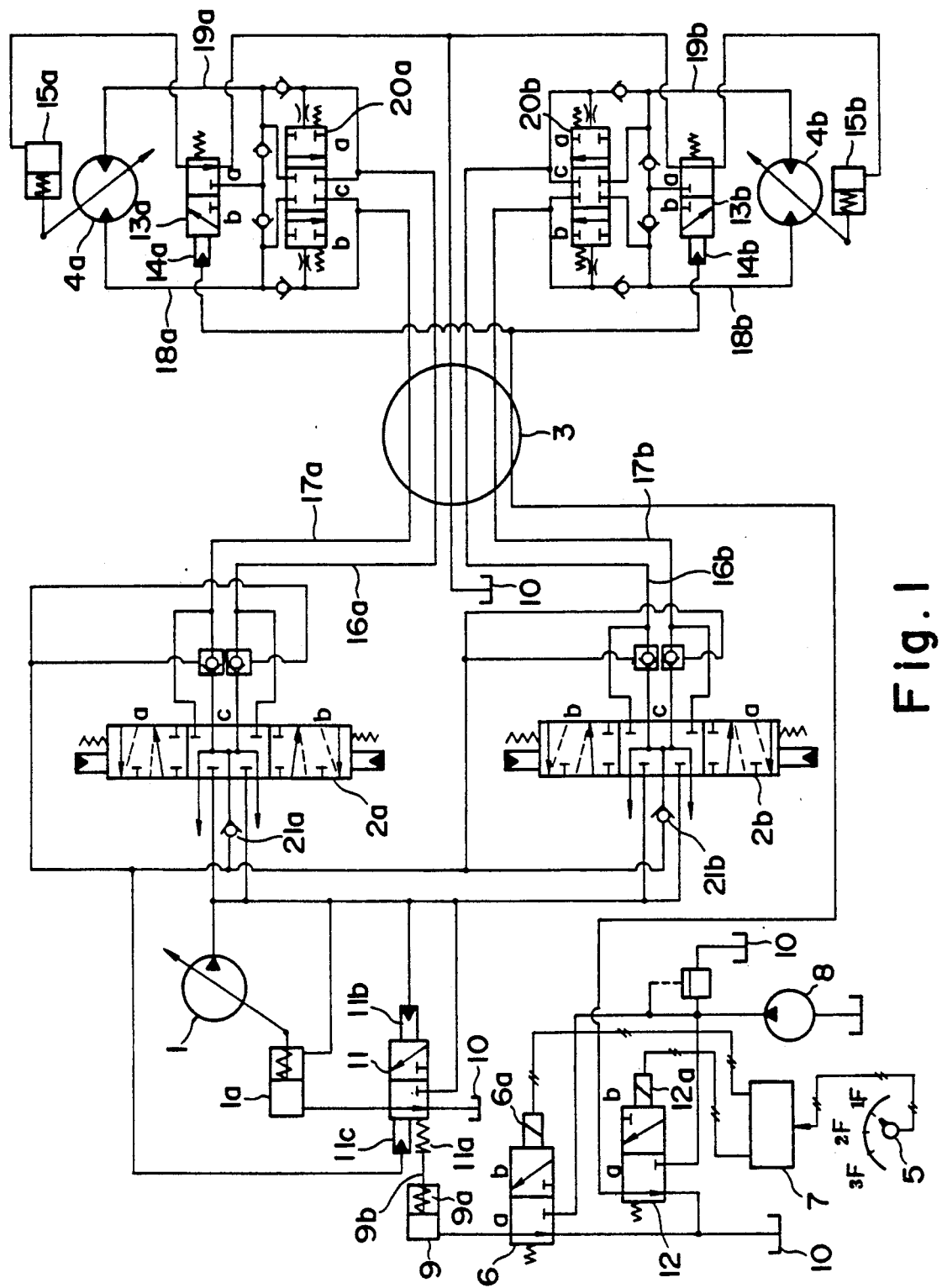
FIG. 1 is a hydraulic circuit diagram showing a hydraulic circuit of traveling speed control device for a hydraulic excavator in accordance with an embodiment of the present invention.

A detailed description will be given of an embodiment of the present invention, with reference to FIGS. 1 and 2. The traveling speed of a hydraulic excavator is controlled by supplying the hydraulic pressure from a hydraulic pump 1 to left and right traveling motor 4a, 4b via swivel joint 3, after controlling the hydraulic pressure by left and right travel operation valves 2a, 2b, as shown in FIG. 1. When a traveling speed changeover switch 5 is set to select the first speed stage, the solenoid 6a of a control pressure changeover valve 6 is de-energized so that the control pressure changeover valve 6 is set to a position a, whereby a spring force adjusting cylinder 9 is connected to the tank 10. As a result, the piston rod 9b is moved to the left by the force of the spring 9a in the spring force adjusting cylinder 9, so that the set force F of the pressure differential setting spring 11a of the load sensing valve 11 is reduced. Therefore, referring to the formula (2) mentioned before, the displacement Q of the hydraulic pump 1 is reduced by an amount corresponding to the amount of reduction of the set force F of the differential pressure setting valve 11, even when the amount of operation (opening degree) of the traveling operation valves 2a and 2b is unchanged, with the result that the traveling speed is decreased correspondingly. Meanwhile, the signal set by the aforementioned traveling speed changeover switch 5 serves to de-energize the solenoid 12a of the control pressure changeover valve 12 via the controller 7, so that the control pressure changeover valve 12 is set to the position a, thus bringing the pilot cylinders 14a, 14b of the traveling motor capacity control valves 13a, 13b into communication with the tank 10. Consequently, the traveling motor capacity control valve 13a, 13b are set to the position a, so as to allow the traveling motor capacity control cylinder 15a, 15b to communicate with the tank 10, whereby the left and right traveling motors 4a, 4b are set to greater capacity for attaining first traveling speed stage.

Then, as the traveling speed changeover switch 5 is set to the second speed stage, the signal set by the traveling speed changeover switch 5 serves to de-energize the solenoid 6a of the control pressure changeover valve 6 via the controller 7, so that the control pressure changeover valve 6 is set to the position a, with the result that the spring force adjusting cylinder 9 is connected to the tank 10. Consequently, the piston rod 9b in the spring force adjusting cylinder 9 is moved to the left by the force of the spring 9a so as to reduce the set force F of the differential pressure setting spring 11a of the load sensing valve 11. Consequently, referring to FIG. 2, the displacement Q of the hydraulic pump 1 is reduced by an amount corresponding to the amount of reduction of the set force F, even when the amount of operation (opening degree) of the traveling operation valves 2a, 2b is unchanged, with the result that the traveling speed is reduced correspondingly. At the same time, the signal set by the traveling speed changeover switch 5 serves to excite the solenoid 12a of the control pressure changeover valve 12 via the operation of the controller 7, so that the control pressure changeover valve 12 is set to the position b, whereby the pilot cylinders 14a, 14b of the traveling motor capacity changeover valves 13a, 13b are connected to the control pump 8. Consequently, the traveling motor capacity changeover valves 13a, 13b are set to the position b, so that the traveling motor capacity control cylinders 15a, 15b are supplied with the driving pressure of the traveling motors, whereby the left and right traveling motors 4a, 4b are set to small capacities, whereby the excavator runs at the second speed stage.

Subsequently, as the traveling speed changeover switch 5 is set to the third speed stage, the signal set by the traveling speed changeover switch 5 serves to excite the solenoid 6a of the control pressure changeover valve 6, whereby the control pressure changeover valve 6 is set to the position b, with the result that the spring force adjusting cylinder 9 is connected to the control pump 8. As a result, the piston rod 9b in the spring force adjusting cylinder 9 is moved to the right overcoming the force of the spring 9a, so as to increase the set force F of the differential pressure setting spring 11a of the load sensing valve 11. Consequently, referring to the formula (2), the displacement Q of the hydraulic pump 1 is increased by an amount corresponding to the increase in the set force F of the differential pressure setting spring 11a, even when the amounts of operation (opening degree) of the travel operation valves 2a, 2b are unchanged, with the result that the traveling speed is increased correspondingly. At the same time, the signal set by the traveling speed changeover switch 5 serves to excite the solenoid 12a of the control pressure changeover valve 12 via the controller 7, so that the control pressure changeover valve 12 is set to the position b, whereby the pilot cylinders 14a, 14b of the traveling motor capacity changeover valves 13a, 13b are connected to the control pump 8. Consequently, the traveling motor capacity changeover valves 13a, 13b are set to the position b, so that the driving pressure in the traveling motors is supplied to the traveling motor capacity control cylinders 15a, 15b, whereby the left and right traveling motors 4a, 4b are set to small capacity to enable the excavator to run at the third speed stage.

A description will now be given of the operation during running at the first speed stage shown in FIG. 1. Travel operation valves 2a, 2b are respectively set to the position a by manipulation of traveling operation levers which are not shown, so that the oil discharged from the hydraulic pump 1 at a rate corresponding to the amount of operation of the travel operation valves 2a, 2b is supplied to the left and right traveling motors 4a, 4b via driving lines 16a, 16b and is discharged therefrom to the discharge lines 18a, 18b. In this state, since the counterbalance valves 20a, 20b have been set to the position a by the driving pressure existing in the driving lines 16a, 16b, so that the working oil discharged to the discharge lines 18a, 18b is returned to the tank 10 via the return line (not shown), past the counterbalance valves 20a, 20b, swivel joint 3 and the traveling speed changeover valves 2a, 2b.

Thus, the left and right traveling motors 4a, 4b rotate at speeds corresponding to the amounts of operations of the aforesaid traveling operation levers, so as to drive the excavator forward or backward at the speed corresponding to the speed of rotation. Assuming that the positions a of the travel operation valves 2a, 2b correspond to forward running of the excavator, the positions b obviously correspond to the backward traveling of the excavator. The operation for the backward traveling is not described because it is materially the same as that for the forward traveling. The oil discharged from the hydraulic pump 1 is introduced into the first pilot chamber 11b of the load sensing valve 11, while the second pilot chamber 11c is supplied with the higher one of the driving pressures existing in the driving lines 16a, 16b, via the travel operation valves 2a, 2b and the check valves 21a, 21b. Consequently, the discharge pressure of the hydraulic pump 1 is reduced by an amount corresponding to the pressure differential between the first pilot chamber 11b and the second pilot chamber 11c, i.e., the set force F of the differential pressure setting spring 11a, so as to control the capacity control cylinder 1a of the hydraulic pump 1. That is, a pressure differential corresponding to the spring force of the spring 11a of the load sensing valve 11 always exists between the upstream and downstream sides of the traveling operation valves 2a, 2b so that the rate of discharge from the hydraulic pump 1 is always controlled in accordance with the amount of operation of the traveling operation valves 2a, 2b.

A description will now be given with specific reference to FIG. 2. FIG. 2(a) is a graph showing the relationship between the displacement Q of the hydraulic pump 1 and the load pressure P as obtained in the present invention. As will be seen from Table 1, during running at the first and second speed stages, the displacement of the hydraulic pump 1 is set to 80% at the maximum (with the travel operation valves 2a, 2b set to full opening). Therefore, there is a margin amounting to 20% of the full power of the hydraulic pump 1 for the operation of the working machine during the traveling. Therefore, the pump displacement can be increased up to 20% when such an increase is necessary for the operation of the working machine, so that the working machine can be operated without causing any reduction in the traveling speed, whereby the simultaneous operation characteristic can be improved.

Figure 2C:
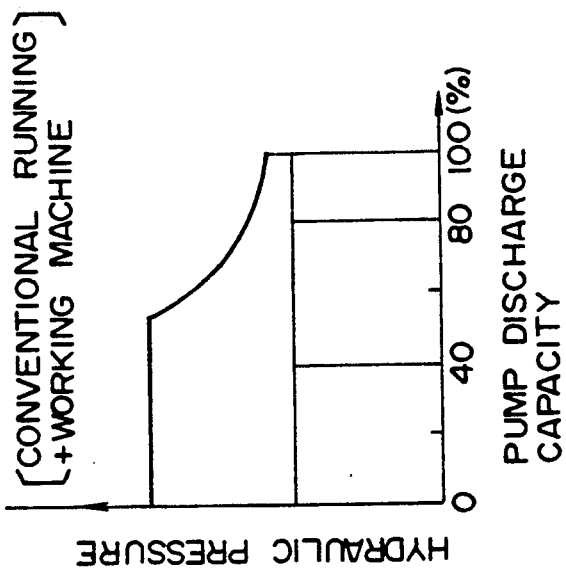
FIG. 2(a) (b) (c) is a diagram showing the relationship between the displacement and discharge pressure observed with a hydraulic pump employed in the embodiment, in comparison with that observed with a hydraulic pump employed in a conventional system.
Figure 2B:
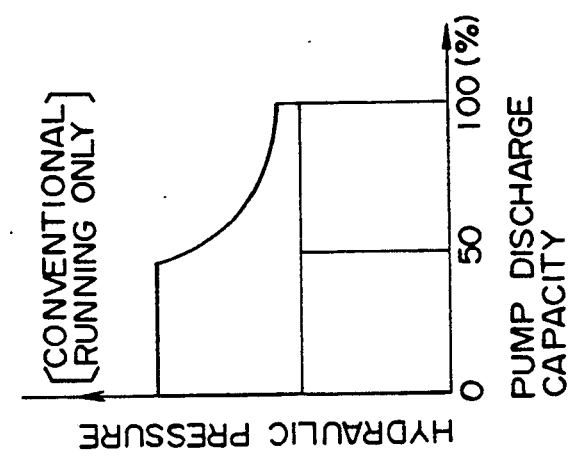
Figure 2A:
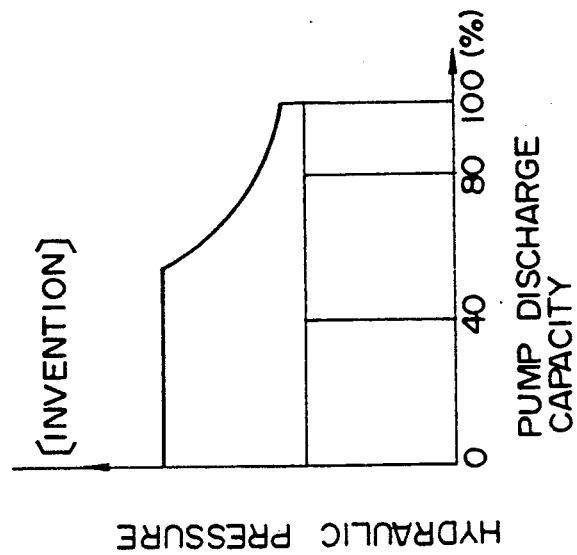
Figure 3:
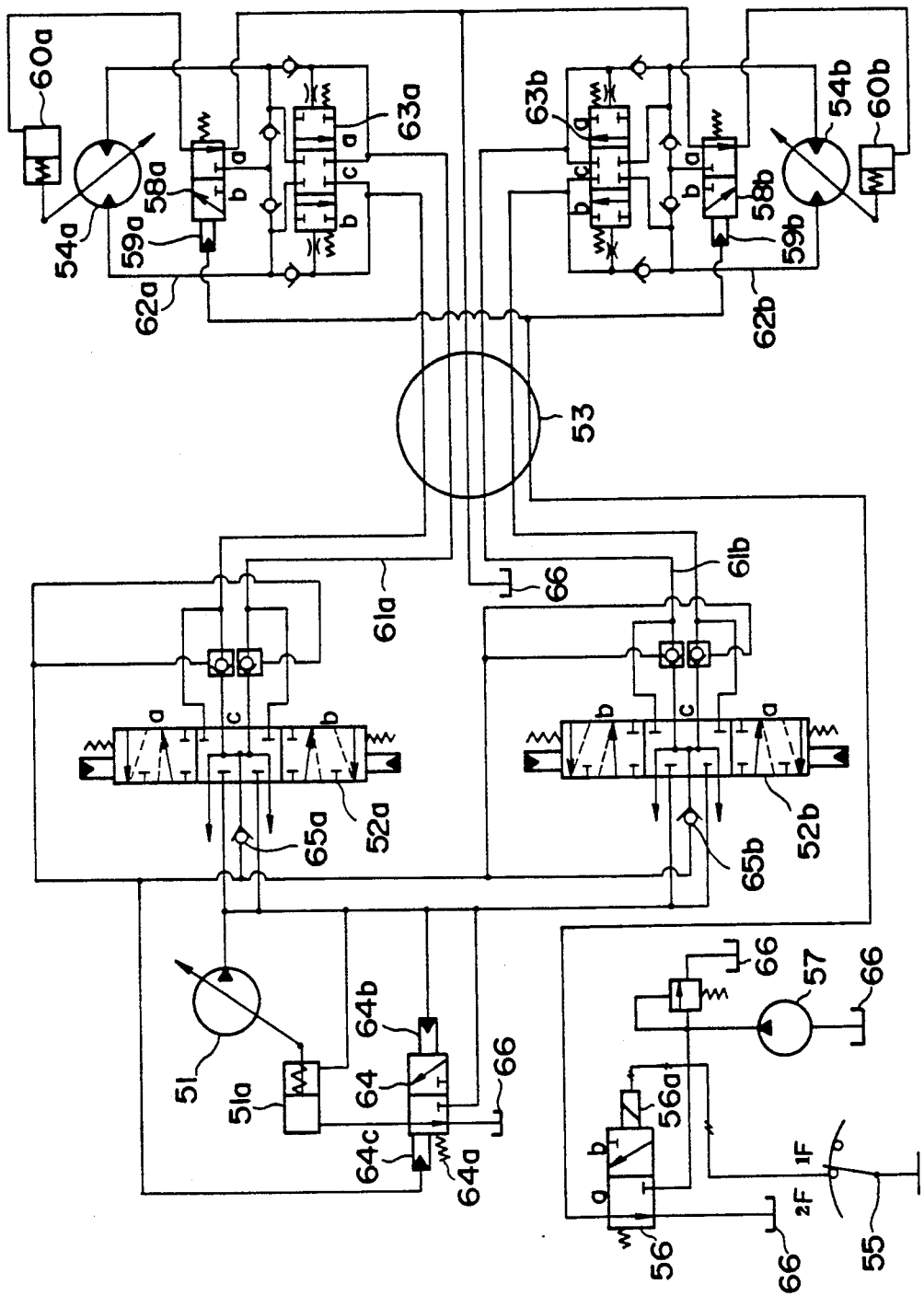
FIG. 3 is hydraulic circuit diagram showing a hydraulic circuit of a conventional traveling speed control device.

FIGS. 2(b) and 2(c) illustrate conventional arts for the purpose of comparison. More specifically, FIG. 2(b) shows the state in which traveling system operates alone. In this state, the hydraulic pump 1 delivers oil at 100% displacement to the left and right traveling motors 4a, 4b (with the travel operation valves 2a, 2b fully opened). FIG. 2(c) shows the state in which the working machine is operated during the traveling by being supplied with 20% of the full displacement of the hydraulic pump 1. Consequently, the left and right traveling motors are supplied only with 80% of the full displacement, with the result that the traveling speed is reduced correspondingly, thus impairing the simultaneous operation characteristic.

TABLE 1

| Speed Stage | 1st | 2nd | 3rd |
|---|---|---|---|
| Hydraulic pump displacement | 80% | 80% | 100% |
| Control press. changeover valve 6 | OFF | OFF | ON |
| Control press. changeover valve 12 | OFF | ON | ON |
| Max. vehicle speed ratio | 50 | 80 | 100 |

Industrial Applicability

The present invention provides a traveling speed changeover device for a hydraulic excavator, capable of changing the traveling speed over three or more speed stages so as to facilitate selection of traveling speed according to the conditions of the road and the state of the work, while improving the simultaneous operation characteristic to enable fine control of the working machine during traveling of the excavator.

I claim:

1. Apparatus for changing the traveling speed of a hydraulically actuated working machine, said apparatus comprising:
   a first hydraulic traveling motor,
   a first traveling motor capacity control cylinder connected to said first hydraulic traveling motor,
   a first traveling motor capacity control valve connected to control said first traveling motor capacity control cylinder,
   a second hydraulic traveling motor,
   a second traveling motor capacity control cylinder connected to said second hydraulic traveling motor,
   a second traveling motor capacity control valve connected to control said second traveling motor capacity control cylinder, each of said first and second traveling motor capacity control valves having a pilot port,
   a hydraulic pump for supplying hydraulic oil to said first hydraulic traveling motor and to said second hydraulic traveling motor to provide driving pressure in said first and second hydraulic traveling motors,
   a first operation valve connected between said hydraulic pump and said first hydraulic traveling motor for determining the rate and direction of rotation of said first hydraulic traveling motor,
   a second operation valve connected between said hydraulic pump and said second hydraulic traveling motor for determining the rate and direction of rotation of said second hydraulic traveling motor,
   a source of hydraulic control pressure,
   a first control pressure changeover valve for controlling the supply of hydraulic pressure from said source to the pilot port of said first and second traveling motor capacity control valves for changing the capacity of said first and second hydraulic traveling motors over two stages in accordance with the operation of the first control pressure changeover valve,
   a capacity control element for controlling the capacity of said hydraulic pump,
   a load sensing valve having first and second pilot chambers and a spring for providing a differential pressure setting force, said load sensing valve being connected to said capacity control element for controlling the capacity of said hydraulic pump,
   a first conduit for applying to said first pilot chamber the pressure of the hydraulic oil discharged by said hydraulic pump,
   a second circuit for applying to said second pilot chamber a pressure representative of the driving pressure in said first and second hydraulic traveling motors,
   an adjusting device capable of changing the differential pressure setting force of said spring, whereby said hydraulic pump is controlled in accordance with the balance of the thrust forces produced in said first and second pilot chambers and the differential pressure setting force of said spring,
   a second control pressure changeover valve for supplying hydraulic control pressure from said source to said adjusting device to vary the differential pressure setting force of said spring,
   a speed changeover switch having at least a first stage speed position, a second stage speed position, and a third stage speed position, and
   a controller responsive to the position of said speed changeover switch for providing a first changeover command to said first control pressure changeover valve to vary the capacity of said first and second hydraulic traveling motors in accordance with said first changeover command, and for providing a second changeover valve to vary the differential pressure setting force of said spring in accordance with said second changeover command, whereby the traveling speed of said hydraulically actuated working machine can be changed over at least three stages corresponding to the first, second and third stage speed positions of said speed changeover switch while for each of said first, second and third stage speed positions of said speed changeover switch said first traveling motor is operated at a rate corresponding to the amount of operation of said first operation valve and said second traveling motor is operated at a rate corresponding to the amount of operation of said second operation valve, to thereby provide an optimum traveling speed according to the condition of the work while improving simultaneous operation characteristic during fine control of the working machine.

2. Apparatus in accordance with claim 1 wherein said source of hydraulic control pressure comprises a control pressure pump.

3. Apparatus in accordance with claim 2 wherein said first control pressure changeover valve has a first position in which hydraulic control pressure is supplied from said control pressure pump to the pilot port of each of said first and second traveling motor capacity control valves, and a second position in which hydraulic oil passes from the pilot port of each of said first and second traveling motor capacity control valves to a tank, and wherein said speed changeover switch can cause said first control pressure changeover valve to move from one of its first and second positions to the other of its first and second positions.

4. Apparatus in accordance with claim 3 wherein said second control pressure changeover valve has a first position in which hydraulic control pressure is supplied from said control pressure pump to said adjusting device and a second position in which hydraulic oil passes from said adjusting device to a tank, and wherein said speed changeover switch can cause said second control pressure changeover valve to move from one of its first and second positions to the other of its first and second positions.

5. Apparatus in accordance with claim 3 wherein each of said first and second control pressure changeover valves is a solenoid actuated valve.

6. Apparatus in accordance with claim 5 wherein said adjusting device comprises an adjusting cylinder.

7. Apparatus in accordance with claim 6 wherein said adjusting cylinder is a spring biased cylinder.

8. Apparatus in accordance with claim 1 wherein said first control pressure changeover valve has a first position in which hydraulic control pressure is supplied from said source to the pilot port of each of said first and second traveling motor capacity control valves, and a second position in which hydraulic oil passes from the pilot port of each of said first and second traveling motor capacity control valves to a tank, and wherein said speed changeover switch can cause said first control pressure changeover valve to move from one of its first and second positions to the other of its first and second positions.

9. Apparatus in accordance with claim 1 wherein said second control pressure changeover valve has a first position in which hydraulic control pressure is supplied from said source to said adjusting device and a second position in which hydraulic oil passes from said adjusting device to a tank, and wherein said speed changeover switch can cause said second control pressure changeover valve to move from one of its first and second positions to the other of its first and second positions.

10. Apparatus in accordance with claim 1 wherein each of said first and second control pressure changeover valves is a solenoid actuated valve.

11. Apparatus in accordance with claim 1 wherein said adjusting device comprises an adjusting cylinder.

12. Apparatus in accordance with claim 11 wherein said adjusting cylinder is a spring biased cylinder.

* * * * *

UNITED STATES PATENT AND TRADEMARK OFFICE
CERTIFICATE OF CORRECTION

PATENT NO. : 5,331,812
DATED : July 26, 1994
INVENTOR(S) : Hiroshi Imai

It is certified that error appears in the above-indentified patent and that said Letters Patent is hereby corrected as shown below:

Column 7, line 60, after "hydraulic", insert --control--.

Column 8, line 9, delete "circuit" and insert --conduit--.

Column 8, line 32, after "changeover", insert --command to said second pressure changeover--.

Signed and Sealed this

Eleventh Day of October, 1994

Attest:

BRUCE LEHMAN

Attesting Officer

Commissioner of Patents and Trademarks